US010558471B2

(12) United States Patent
Pasirstein

(10) Patent No.: US 10,558,471 B2
(45) Date of Patent: Feb. 11, 2020

(54) PROOF OF CONFIGURATION

(71) Applicant: Merck Sharp & Dohme Corp., Rahway, NJ (US)

(72) Inventor: David Brett Pasirstein, Morristown, NJ (US)

(73) Assignee: Merck Sharp & Dohme Corp., Rahway, NJ (US)

( * ) Notice: Subject to any disclaimer, the term of this patent is extended or adjusted under 35 U.S.C. 154(b) by 17 days.

(21) Appl. No.: 15/892,898

(22) Filed: Feb. 9, 2018

(65) Prior Publication Data

US 2019/0250929 A1   Aug. 15, 2019

(51) Int. Cl.
*G06F 9/445* (2018.01)
*G06F 21/60* (2013.01)
*G06F 11/22* (2006.01)

(52) U.S. Cl.
CPC ...... *G06F 9/44505* (2013.01); *G06F 11/2289* (2013.01); *G06F 21/602* (2013.01)

(58) Field of Classification Search
CPC .................................................. G06F 9/44505
USPC ....................................................... 707/659
See application file for complete search history.

(56) References Cited

U.S. PATENT DOCUMENTS

| | | | |
|---|---|---|---|
| 6,282,175 B1 * | 8/2001 | Steele | G06F 11/0709 370/254 |
| 7,761,851 B2 | 7/2010 | Bailey et al. | |
| 2011/0055636 A1 * | 3/2011 | DeHaan | G06F 11/2247 714/37 |
| 2014/0336795 A1 * | 11/2014 | Asenjo | G05B 19/4083 700/86 |
| 2016/0330027 A1 * | 11/2016 | Ebrahimi | H04L 9/3066 |
| 2016/0342403 A1 * | 11/2016 | Zamir | G06F 8/61 |

OTHER PUBLICATIONS

Chef Homepage, Chef Software, Inc., 2008-2018, 2 pages, [Online] [Retrieved on Apr. 26, 2018] Retrieved from the Internet<URL:www.chef.io>.
Puppet Homepage, Puppet, 2018, 3 pages, [Online] [Retrieved on Apr. 26, 2018] Retrieved from the Internet<URL:https://puppet.com>.

* cited by examiner

*Primary Examiner* — Alford W Kindred
*Assistant Examiner* — Allen S Lin
(74) *Attorney, Agent, or Firm* — Fenwick & West LLP

(57) ABSTRACT

When a system configuration is deployed, the recipe used, the results of the deployment, and/or the results of any qualification tests performed may be anchored to a distributed ledger. Periodically, the system configuration may be audited by verifying the recipe against the anchored version. The results of such audits may also be anchored to the distributed ledger. Thus, what is anchored to the distributed ledger represents a cryptographically verifiable history of the configuration of the system. Consequently, the system configuration at any time can be proven by comparing historical configuration information maintained by the owner of the system to the distributed ledger.

21 Claims, 8 Drawing Sheets

PROOF OF CONFIGURATION

TECHNICAL FIELD

The disclosure generally relates to the field of computer system configuration, and in particular to proving a system was configured as intended at a specified time.

BACKGROUND

In various contexts, it is desirable to prove that a computer system is configured as intended either presently or at some point in the past. In regulated industries, the regulatory body may require that the computer system is configured according to an approved configuration. For example, in the pharmaceutical industry, the United States Food and Drug Administration (FDA) requires that computer systems that provide various functions (e.g., collection of medical test data) meet certain configuration requirements.

There are existing processes for proving system configuration that rely on providing a paper trail. However, they require a great deal of time and effort on behalf of the entity that controls the system, which in turn represents significant costs associated with compliance with the regulatory requirements. Furthermore, these processes inherently rely on the trustworthiness of the person or people generating and storing the paperwork. Paperwork may be falsified, modified, or back-dated to create an audit trail that appears to prove a system was configured correctly at a given time when in fact it was not. Thus, a reliable automated or semi-automated process for proving system configuration could provide value to companies and individuals, particularly in heavily regulated industries.

BRIEF DESCRIPTION OF THE DRAWINGS

The disclosed embodiments have advantages and features which will be more readily apparent from the detailed description, the appended claims, and the accompanying figures (or drawings). A brief introduction of the figures is below.

DETAILED DESCRIPTION

Figure 1:
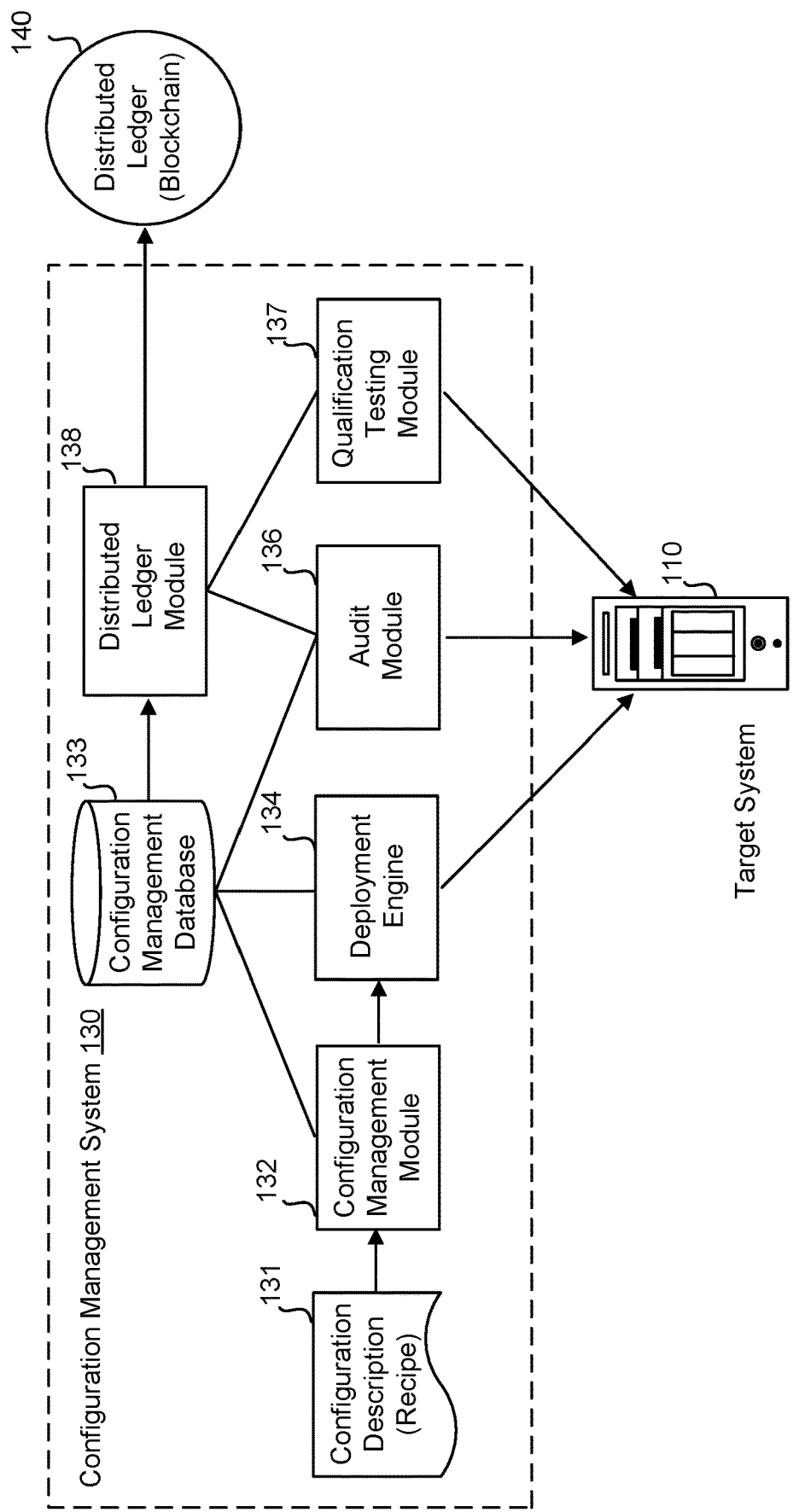
FIG. 1 illustrates an example networked computing environment in which proof of configuration may be provided, according to one embodiment.

The Figures (FIGS.) and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

Configuration Overview

Distributed ledgers were developed as a means for parties to engage in transactions, e.g., financial transactions, without the need for a single, trusted intermediary. In such systems, each transaction is recorded independently by several nodes (e.g., on a blockchain). No one entity controls all of the nodes so it is impossible (or at least exceedingly difficult) for a malicious actor to alter the transaction once it has been recorded by the nodes. Accordingly, the transactions can be conducted without the parties needing to trust each other, or any individual node provider. Although the terms "distributed ledger" and "blockchain" are used in discussion of various embodiments below, one of skill in the art will recognize that other forms of distributed storage, such as a distributed database, may be used without departing from the spirit or scope of what is disclosed. Thus, references to distributed ledgers and blockchains should be considered to encompass these other forms of distributed storage.

The use of distributed ledgers to provide cryptographically verifiable records is not limited to financial transactions. Once a data item has been added to a distributed ledger, it becomes extremely difficult to alter as they are essentially immutable and subject to inquiry and additional analysis when they fork. That data item, as well as the time it was added to the ledger, can be viewed by anyone with access to the ledger. In typical cases, the nodes of a distributed ledger can be accessed publicly via the internet, thus making the data item and its history available to anyone with an internet-enabled computer and appropriate software.

When a system configuration is deployed, the recipe used, the results of the deployment, and/or the results of any qualification tests performed may be anchored to a distributed ledger. Periodically, the system configuration may be audited by verifying the recipe against the anchored version and confirming that the system is still configured consistently with the recipe. The results of such audits may also be anchored to the distributed ledger. Thus, what is anchored to the distributed ledger represents a cryptographically verifiable history of the configuration of the system. The configuration of the system at any time can therefore be proven by comparing historical configuration information maintained by the owner of the system with the versions anchored to the distributed ledger. This proof can be relied upon without trusting the owner of the system (or any other entity) because the configuration information that is anchored to the blockchain is outside the control of any one party and is exceedingly difficult to modify.

Disclosed by way of example embodiment is a configuration that may include a method (and/or corresponding system and computer-readable medium storing instructions executable by one or more processors) for proving a system was configured consistently with an approved configuration at a specified time (including the current time). An example configuration may include retrieving configuration information for the computer system from a data store that relates to deployment of a configuration recipe to the computer system. A set of one or more reduced representations (e.g., hashes) were previously generated based on the configuration information and submitted to a distributed ledger to be anchored. The example configuration may include regenerating the reduced representations from the configuration information and identifying event confirmations corresponding to the earlier submission of the reduced representations to the distributed ledger. For each event confirmation, the configuration may verify that the corresponding reduced representation was successfully anchored to the distributed ledger. The configuration of the computer system may then be audited by comparing the configuration of the computer system to the configuration recipe.

Example Proof of Configuration System

FIG. 1 illustrates an example embodiment of a networked computing environment 100 in which proof of configuration may be provided. In the embodiment shown in FIG. 1, the networked computing environment 100 includes a target system 110, a configuration management system 130, and a distributed ledger 140 (e.g., a blockchain). In other embodiments, the networked computing environment 100 may include different and/or additional elements. In addition, the functions may be distributed among the elements in a different manner than described.

The target system 110 is one or more computing devices for which providing proof of configuration is desirable. For example, the computing devices may be desktop computers, laptop computers, servers, mainframes, tablets, smartphones, or the like. Although only a single target system 110 is shown for illustrative purposes, the networked computing environment 100 may typically include many such systems. In one embodiment, the existing computer system 110 may be a laboratory computer that stores data regarding pharmacology tests that will be submitted to a regulator. The target system 110 may initially be configured according to a configuration approved by the regulator. However, conventionally, the target system 110 may later be reconfigured, making proving its configuration at a given time practically impossible using the native features of the target system alone.

The configuration management system 130 deploys configurations to managed systems (e.g., target system 110) and may provide audit and qualification testing functionality. In the embodiment shown in FIG. 1, the configuration management system 130 includes a configuration description 131, a configuration management module 132, a configuration management database 133, a deployment engine 134, an audit module 136, a qualification module 137, and a distributed ledger module 138. In other embodiments, the configuration management system 130 may include different and/or additional elements. In addition, the functions may be distributed among the elements in a different manner than described. For example, in one embodiment, a single module may handle deployment, installation verification, and operational qualification.

The configuration description 131 represents a desired configuration of the target system 110 (or a system component) described in a configuration management language. The configuration description 131 is also referred to herein as a recipe. In one embodiment, a recipe includes system configuration information, software to install, software configuration information, and the like. The recipe 131 can be defined using a configuration language developed specifically for use by the configuration management system 130. Alternatively, a commercial or open source configuration description or monitoring language may be used, such as NAGIOS®, CHEF®, PUPPET®, or the like.

The configuration management module 132 manages the lifecycles and versions of recipes 131. In one embodiment, the configuration management module 132 receives a recipe 131 that was created by a user (e.g., a system administrator). The recipe 131 may be a new configuration or an update to an existing configuration (e.g., identified by a configuration ID). If the recipe 131 is a new configuration, the configuration management module 132 may assign it a configuration ID and stores the recipe along with the configuration ID in the configuration management database 133. If the recipe 131 is an update to an existing configuration, the configuration management module 132 identifies and modifies the existing configuration (e.g., by searching the configuration management database 133 using the configuration ID). The configuration management module 132 may modify the existing configuration by adding the provided recipe 131 as a new version and assigning it a version identifier (e.g., a version number). Thus, the history of changes to the configuration can be maintained enabling historical audits.

The configuration management module 132 may also handle obtaining approval for the recipe 131. In one embodiment, the recipe 131 will not be deployed until the required approval (or approvals) are given. The approval is provided by a specified approver (e.g., a regulator or other third-party approver). Approval may be provided using a combination of rules or contract definitions in a smart contract stored in the distributed ledger 140 such that approval results in the recipe 131 or a reduced representation (e.g., a hash or checksum) of the recipe to be added to the ledger. Alternatively, the approval may be provided elsewhere, not using a smart contract. Confirmation of approval and the identity of the prover may also be stored in the configuration management database 133 in conjunction with the recipe 131 (e.g., by storing a user ID of the approver in a field of the database). In some instances, multiple approvals are required (e.g., a regulator and a compliance officer of the entity controlling the target system 110). Alternatively, if no approval is required, or an urgent change is required before approval can be obtained, the identity of the user that submitted the recipe 131 may be stored as the approver.

The configuration management database 133 stores the recipes used by the configuration management system 130. In one embodiment, the configuration management database 133 is stored in one or more computer readable media configured to store the recipes. In FIG. 1, the configuration management database 133 is shown as a single entity located within the configuration management system 130. However, it may be distributed across several computing devices that are connected via a network.

The deployment engine 134 deploys the configuration defined in the recipe 131 to the target system 110. The deployment can be either a build for a new system or a change for an existing system. In one embodiment, the deployment engine 134 directs configuration of the target system 110 as indicated in the recipe 131 via the network. The deployment engine 134 may also verify the success of the installation (installation qualification) or change implementation (change qualification) based on results returned by the target system 110. The deployment engine 134 and/or the configuration management module 132 may store the results of the qualification testing in the configuration management database 133.

The audit module 136 verifies that the target system 110 was configured consistently with the recipe 131 at a specified time. In one embodiment, the audit module 136 maintains a data store with previous audit results and an Apostille history for those results. The audit module 136 periodically (e.g., daily, weekly, etc.) verifies that the target system's configuration is consistent with the recipe 131 and adds the results to the data store. In other words, the specified time in such cases is the current time. Additionally or alternatively, the audit module 16 may enable a user (e.g., a system administrator) to trigger an audit and specify the time for which auditing is desired. Thus, the audit module 136 may also provide proof that the target system 110 was configured as intended at a given point in the past. The audit module is described in greater detail below, with reference to FIGS. 2 and 3.

The qualification module 137 runs qualification tests on the target system 110 to confirm that deployment was successful. In one embodiment, the qualification module 137 applies one or more operational qualification tests to the target system 110. The qualification module 137 may find the specific system tests in the recipe 131 or they may be defined and stored separately. The qualification module 137 may send the results to the configuration management module 132, which stores them in the configuration management database 133. Alternatively, the qualification module 137 may store the results directly.

The distributed ledger module 138 manages interactions between the configuration management system 130 and the distributed ledger 140. In one embodiment, the distributed ledger module anchors the recipes 131 as well as approvals and the results of qualification tests and audits to the distributed ledger 140. Anchoring may add the recipes 131, approvals, and results of qualification tests and audits to the ledger 140 in full or reduced representations (e.g., hashes or checksums) may be added. If the qualification tests used are not include in a recipe 131, these may also be anchored to the distributed ledger 140 (either in full or using a reduced representation). The distributed ledger module 138 may also be configured to retrieve the recipes 131, approvals, and results of qualification tests and audits from the ledger 140 (e.g., as part of an audit process).

As described above, the distributed ledger 140 provides a mechanism to verify that a given recipe 131 existed at a specified time and that the target machine 110 was configured consistently with the recipe at that time. Because data anchored to the distributed ledger 140 is exceedingly difficult to modify, the appended recipes 131, approvals, and results of qualification tests and audits can be considered accurate representations of the state of the target system 110 at the time the data was anchored to the ledger. In one embodiment, the distributed ledger 140 is a blockchain. In other embodiments, other types of distributed ledger or database are used to provide proof of configuration of the target system 110.

The components of the networked computing environment 100 may communicate via a network (not shown). The network can include any combination of local area and/or wide area networks, using both wired and/or wireless communication systems. In one embodiment, the network uses standard communications technologies and/or protocols. For example, the network can include communication links using technologies such as Ethernet, 802.11, worldwide interoperability for microwave access (WiMAX), 3G, 4G, 5G, code division multiple access (CDMA), digital subscriber line (DSL), etc. Examples of networking protocols used for communicating via the network include multiprotocol label switching (MPLS), transmission control protocol/Internet protocol (TCP/IP), hypertext transport protocol (HTTP), simple mail transfer protocol (SMTP), and file transfer protocol (FTP). Data exchanged over the network may be represented using any suitable format, such as hypertext markup language (HTML) or extensible markup language (XML). In some embodiments, all or some of the communication links of the network 170 may be encrypted using any suitable technique or techniques.

Figure 2:
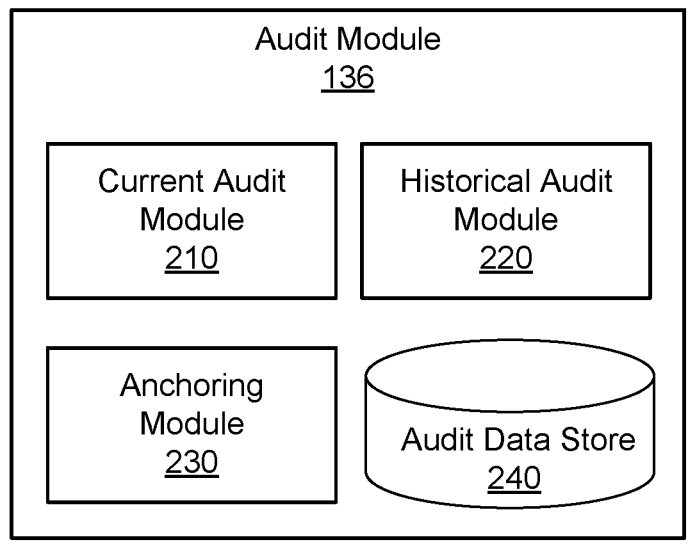
FIG. 2 illustrates an audit module configured for use in the networked computing environment of FIG. 1, according to one embodiment.

FIG. 2 shows one embodiment of an audit module 136 that verifies a target system 110 was configured consistently with a recipe 131. In the embodiment shown in FIG. 2, the audit module 136 includes a current audit module 210, a historical audit module 220, an anchoring module 230, and an audit data store 240. In other embodiments, the audit module 136 may include different and/or additional elements. In addition, the functions may be distributed among the elements in a different manner than described.

The current audit module 210 conducts audits of the current configuration of a deployed system or systems (e.g., target system 110). In one embodiment, the current audit module 210 conducts regular audits on a configurable schedule, such as daily, weekly, monthly, or the like. The audits compare the current configuration of deployed systems to the most recently approved configurations for those systems. The schedule may be configured (e.g., by a system administrator) to balance the amount of computing resources dedicated to auditing with the importance of determining the exact time at which a system deviated from its approved configuration. For example, nightly audits will generate audit data every day, requiring a relatively large amount of storage, but will immediately constrain the time frame for unapproved changes to a deployed system to a twenty-four hour period. Conversely, monthly audits would require substantially less storage, but would only identify the time at which an unapproved change was made to the one month period preceding the audit that detects the change. Embodiments of the current configuration audit process are described in greater detail below, with reference to FIG. 6.

The historical audit module 220 conducts historical audits to verify the configuration of a deployed system (e.g., target system 110) at a specified point in time. In one embodiment, a user specifies the system (or systems) to be audited (e.g., with a system ID) and the time for which verification is required (e.g., by providing a date and time). The historical audit module 220 looks up the recipe 131 for the specified system at a time closest to but not more recent than the specified time in the configuration management database 133. The historical audit module 220 retrieves the recipe 131 and associated data (e.g., deployment results, qualification results, approver ID, etc.). The historical audit module 220 then matches this data (e.g., by comparing hashes) to the Apostille history and/or the data anchored to the distributed ledger 140 for the specified system at the specified time to verify the historical configuration of the system. Embodiments of the historical audit process are described in greater detail below, with reference to FIG. 8.

The anchoring module 230 adds the results of audits to the distributed ledger 140. Due to cost and efficiency considerations, it may be impractical to anchor the results of every audit individually to the distributed ledger 140. Therefore, in one embodiment, the anchoring module 230 aggregates and anchors audit results to the distributed ledger 140 at a configurable interval. The interval may be based on time (e.g., daily, weekly, monthly, or the like) or number of audits since the last anchoring (e.g., every ten audits, every hundred audits, or the like). For example, the anchoring module 230 might identify a set of current audit results as those results with a time stamp more recent than the time stamp of the last anchoring operation. The anchoring module 230 may generate a reduced representation of the results (e.g., a hash) and directly anchor the reduced representation to the distributed ledger 140, or the set may be sent to the distributed ledger module 138 for anchoring. Embodiments of the process for anchoring audit results to the distributed ledger 140 are described in greater detail below, with reference to FIG. 7.

Figure 3:
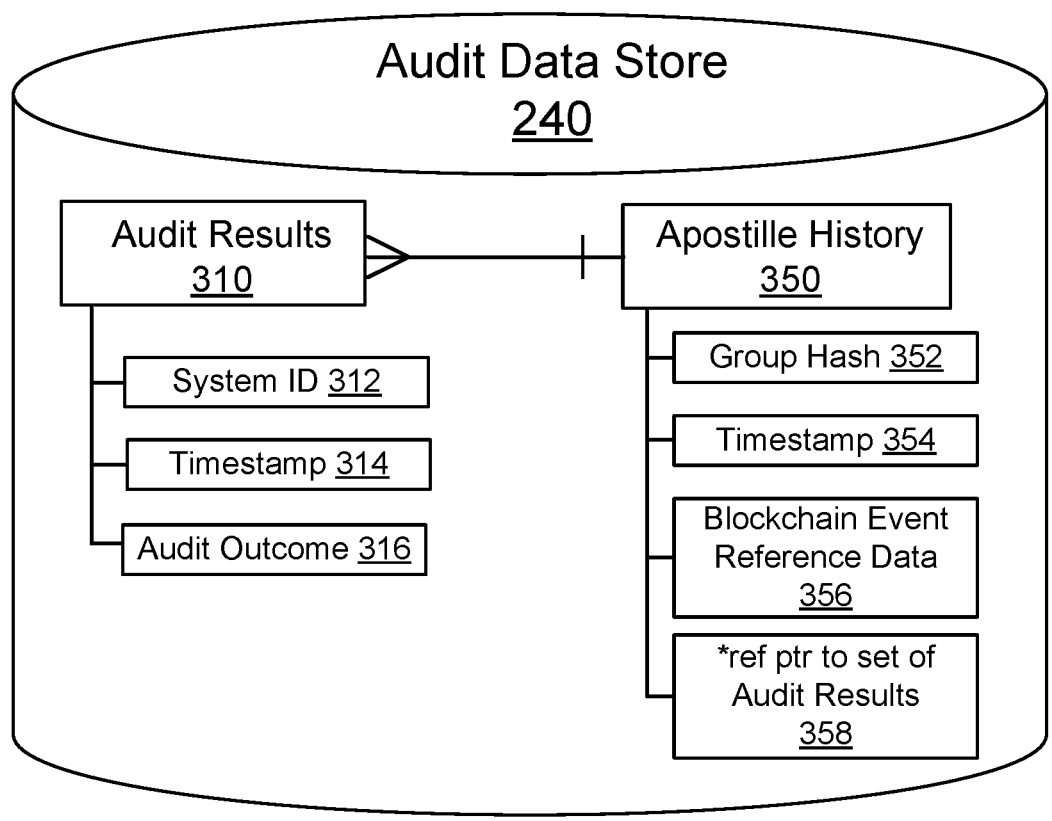
FIG. 3 illustrates a data store configured for use by an audit module, according to one embodiment.

The audit data store 240 includes one or more computer readable media configured to store audit results. Although the audit data store 240 is shown as a single entity that is part of the configuration management system 130, it may also be a distributed database that is partly or entirely accessed via a network. FIG. 3 illustrates one embodiment of the audit data store 240. In the embodiment shown, the audit data store 240 includes audit results 310 and an Apostille history 350 for the system configurations.

The audit results 310 include the results 310 of individual audits conducted by the current audit module 210 and/or the historical audit module 220. In one embodiment, the each result 310 includes a system ID 312, a timestamp 314, and the audit outcome 316. The system ID 310 identifies the specific system on which the audit was performed (e.g., the target system 110). The timestamp 314 indicates the time at which the audit was conducted, which may the time the audit was started, the time the audit was completed, the time the results were added to the audit data store 240, or the like. If the audit was for a specified time other than the current time, the audit results 310 may include timestamps 314 for both the time at which the audit was conducted and the specified time. The audit outcome 316 includes the specific results of the audit, such as whether the audited system was configured consistently with the correct approved recipe 131 at the specified time. In other embodiments, the audit results 310 may include different or additional data.

The Apostille history 350 includes representations of the audit results that may be verified against the distributed ledger 140. The Apostille history 350 may also include metadata associated with the audit result representations. In one embodiment, the Apostille history 350 includes a row for each transaction that anchored audit results to the distributed ledger 140. A row may include a group hash 352, a timestamp 354, blockchain event reference data 356, and a reference pointer 358 to the corresponding set of audit results 310.

The group hash 352 is a hash or other reduced representation generated from a set of audit results 310 timestamped between the current time and the timestamp 354 of the previous row in the Apostille history 350. The timestamp 354 indicates the time at which the row was generated. The blockchain event reference data 356 may include confirmation that the group hash 352 has been anchored to the blockchain 140 (or another distributed ledger/database) and associated reference data. The reference pointer 358 (or pointers) indicate where in the audit results 310 the set of results used to generate the group hash 352 are located. In other embodiments, the Apostille history 350 includes different or additional data.

The audit results 310 and Apostille history 350 can be used as part of various processes to prove a target system 110 is currently or was, at a specified time, configured consistently with an approved recipe 131. For example, a reference pointer 358 can be used to retrieve a set of audit results, recalculate the group hash, and compare it to the stored group hash 352 and/or the anchored group hash to verify that the audit data has not been modified since the time that the group hash was anchored. Thus, users and regulators can have confidence that the target system 110 was configured as indicated by the audit results 310 at the time the audit was conducted. Various embodiments of the auditing process are described in greater detail below, with reference to FIGS. 6 through 8.

Example Machine Architecture

Figure 4:
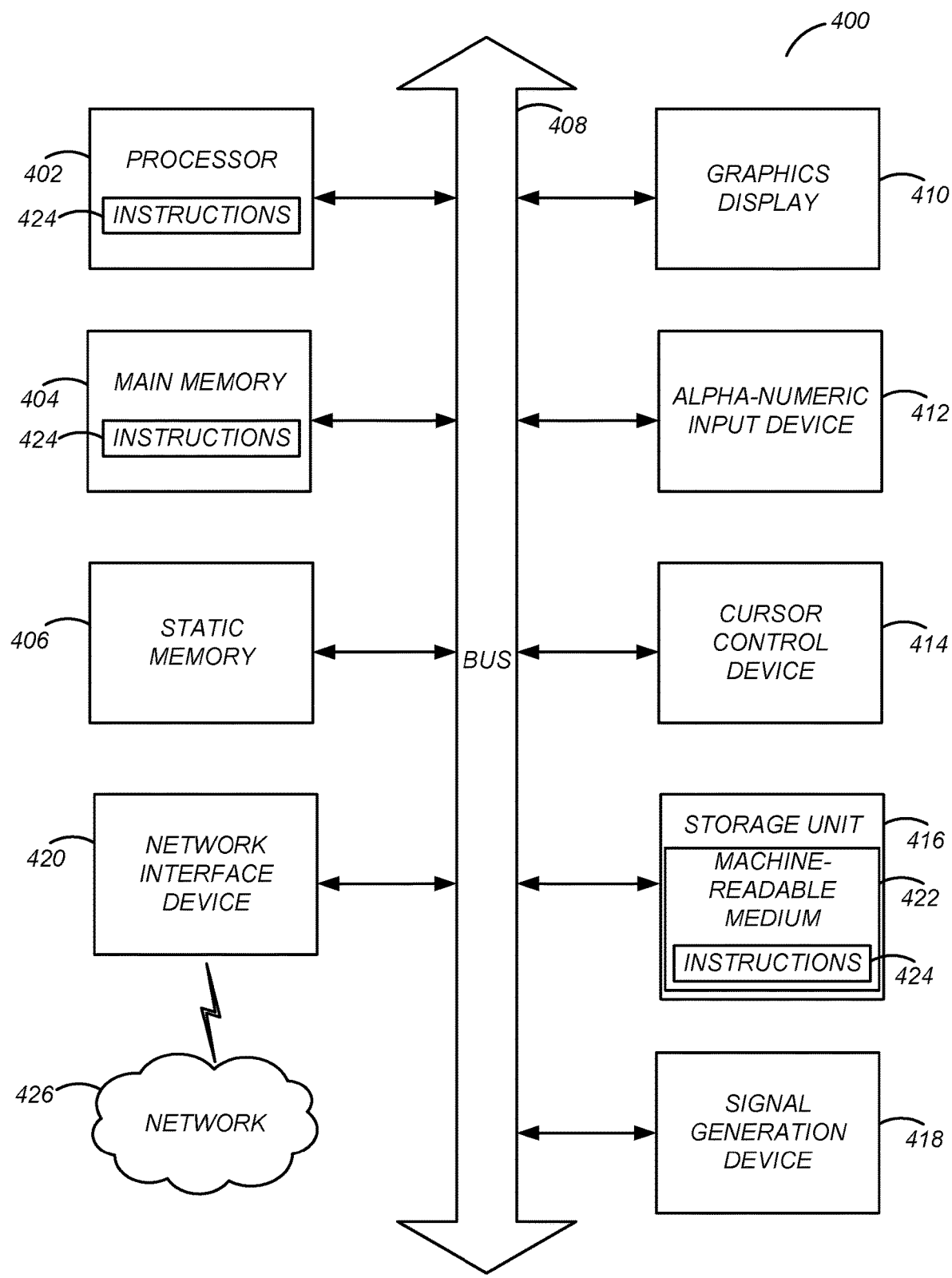
FIG. 4 is a block diagram illustrating components of an example machine able to read instructions from a machine-readable medium and execute them in a processor (or controller), according to one embodiment.

FIG. 4 is a block diagram illustrating components of an example machine able to read instructions from a machine-readable medium and execute them in a processor (or controller). Specifically, FIG. 4 shows a diagrammatic representation of a machine in the example form of a computer system 400. The computer system 400 can be used to execute instructions 424 (e.g., program code or software) for causing the machine to perform any one or more of the methodologies (or processes) described herein, including those associated, and described, with the components (or modules) of a target deployed system 110 and/or configuration management system 130. In alternative embodiments, the machine operates as a standalone device or a connected (e.g., networked) device that connects to other machines. In a networked deployment, the machine may operate in the capacity of a server machine or a client machine in a server-client network environment, or as a peer machine in a peer-to-peer (or distributed) network environment.

The machine may be a server computer, a client computer, a personal computer (PC), a tablet PC, a set-top box (STB), a smartphone, an internet of things (IoT) appliance, a network router, switch or bridge, or any machine capable of executing instructions 424 (sequential or otherwise) that specify actions to be taken by that machine. Further, while only a single machine is illustrated, the term "machine" shall also be taken to include any collection of machines that individually or jointly execute instructions 424 to perform any one or more of the methodologies discussed herein.

The example computer system 400 includes one or more processing units (generally one or more processors 402). The processor 402 is, for example, a central processing unit (CPU), a graphics processing unit (GPU), a digital signal processor (DSP), a controller, a state machine, one or more application specific integrated circuits (ASICs), one or more radio-frequency integrated circuits (RFICs), or any combination of these. Any reference herein to a processor 402 may refer to a single processor or multiple processors. The computer system 400 also includes a main memory 404. The computer system may include a storage unit 416. The processor 402, memory 404, and the storage unit 416 communicate via a bus 408.

In addition, the computer system 400 can include a static memory 406, a display driver 410 (e.g., to drive a plasma display panel (PDP), a liquid crystal display (LCD), or a projector). The computer system 400 may also include alphanumeric input device 412 (e.g., a keyboard), a cursor control device 414 (e.g., a mouse, a trackball, a joystick, a motion sensor, or other pointing instrument), a signal generation device 418 (e.g., a speaker), and a network interface device 420, which also are configured to communicate via the bus 408.

The storage unit 416 includes a machine-readable medium 422 on which is stored instructions 424 (e.g., software) embodying any one or more of the methodologies or functions described herein. The instructions 424 may also reside, completely or at least partially, within the main memory 404 or within the processor 402 (e.g., within a processor's cache memory) during execution thereof by the computer system 400, the main memory 404 and the processor 402 also constituting machine-readable media. The instructions 424 may be transmitted or received over a network 470 via the network interface device 420.

While machine-readable medium 422 is shown in an example embodiment to be a single medium, the term "machine-readable medium" should be taken to include a single medium or multiple media (e.g., a centralized or distributed database, or associated caches and servers) able to store the instructions 424. The term "machine-readable medium" shall also be taken to include any medium that is capable of storing instructions 424 for execution by the machine and that cause the machine to perform any one or more of the methodologies disclosed herein. The term "machine-readable medium" includes, but not be limited to, data repositories in the form of solid-state memories, optical media, and magnetic media.

Example Methods for Configuring a Target System Using a Recipe

FIGS. 5A, 5B, and 6 through 8 illustrate embodiments of various methods that contribute to providing proof of configuration for a target system 110. The steps of these figures are illustrated from the perspective of various entities in the networked computing environment 100 performing the methods. However, some or all of the steps may be performed by other entities and/or components. In addition, some embodiments may perform the steps in parallel, perform the steps in different orders, or perform different steps. Furthermore, although the methods are described as using various hashes, one of skill in the art will recognize that other forms of reduced representation, such as checksums, may be used. Similarly, the methods are described as anchoring various data to a blockchain, but other forms of distributed ledger or database may be used.

Figure 5A:
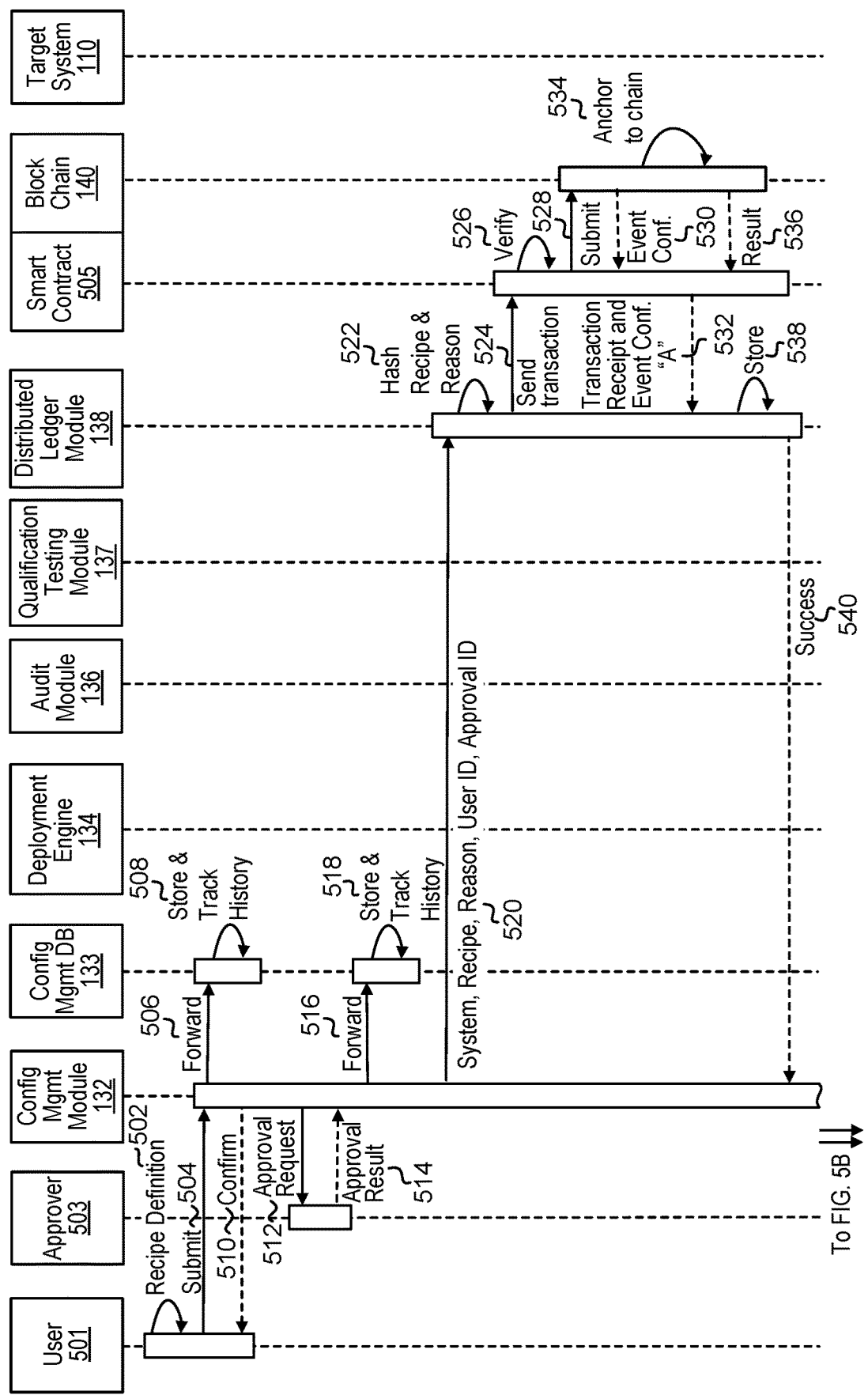
FIGS. 5A and 5B are an event trace for configuring a system and anchoring the configuration in a cryptographically verifiable manner for later auditing, according to one embodiment.
Figure 5B:
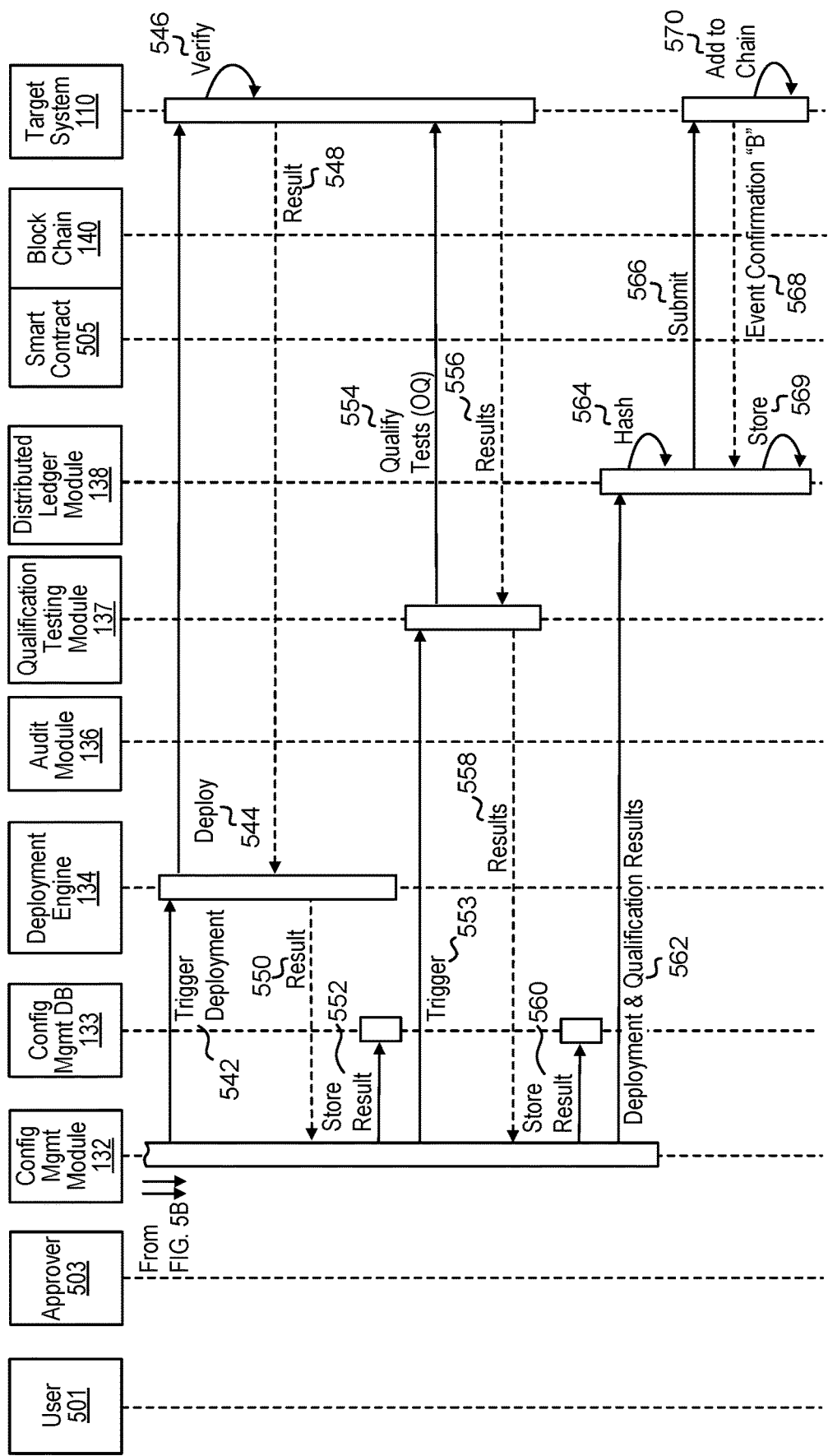

FIGS. 5A and 5B illustrate one embodiment of a method for configuring a system and anchoring the configuration in a cryptographically verifiable manner for later auditing. In the embodiment shown in FIGS. 5A and 5B, the method begins with a user 501 (e.g., a system administrator) creates 502 or updates a recipe 131 intended to be applied to a target system 110. The user 501 submits 504 the recipe 131 to the configuration management module 132. The user 501 may also include a reason/purpose for the creation of or change to the recipe 131. In one embodiment, the transaction submitted 504 is signed with the user's blockchain address.

The configuration management module 132 forwards 506 the recipe 131 (and the reason/purpose if provided) to the configuration management database 133. The recipe 131 is stored 508 along with the reason/purpose (if provided) and a version number for tracking version history. The configuration management module 132 sends 510 a response to the user 501 confirming the submission and start of the process.

If approval is required for the recipe 131, the configuration management module 132 requests 512 approval from a specified approver 503. The configuration management module 132 receives 514 an approval result indicating whether approval was granted by the approver 503 and forwards 516 it to the configuration management database 133, which stores 518 it in conjunction with the specific version of the recipe 131. The approval may be signed by the approvers blockchain address. For example, if the recipe 131 submitted 504 is an update to an existing recipe, the configuration management database 133 might increment the version number of the previous version of the recipe and store the updated version along with the incremented version number, the approval result, and/or the approver's blockchain address.

In one embodiment, if no approval is required or the recipe 131 reflects an urgent change, an identifier of the user 501 (e.g., a user ID) that submitted 504 the recipe 131 may be stored 518 in place of an approval result. In the case of an urgent change, the configuration management module 132 may still request 512 approval from the approver 503 and, assuming it is granted, add the approval to the configuration management database 133. This delayed approval may replace the identifier of the user 501 that submitted 504 the recipe 131 or supplement it.

In another embodiment, the approval occurs in combination with rules or contract definitions contained within the distributed ledger 140 such that the result of the approval event will cause the recipe 131 or a hash of the recipe to be anchored to the ledger. In other words, the approval implementation may more directly interface with the smart contract 505 (discussed below). Alternatively, the approval event can occur elsewhere (outside of/not using a smart contract 505). However, a record of the approval along with the recipe 131 or a hash of the recipe may still be directly recorded to the distributed ledger 140.

Regardless of the specific approval mechanism used, the configuration management module 132 sends 520 information about the recipe 131 to the distributed ledger module 138. In one embodiment, the information includes an identifier of the target system 110 (e.g., a system ID), the recipe 131 itself, the reason/purpose (where provided), an approval identifier (e.g., the approval signed via the approver's blockchain address), and an identifier of user 501 that submitted the recipe (e.g. the user's submission signed by the user's blockchain address).

The distributed ledger module 138 hashes 522 the recipe 531 and the reason/purpose (if provided) and sends 524 a transaction to a smart contract 505 (e.g., on a blockchain). In one embodiment, the transaction includes the hash, an identifier of the user 501, an identifier of the approver 503, and an identifier of the target system 110. The identifier of the target system 110 may be a unique blockchain address dedicated to the target system that is used to record all transactions associated with that system. Alternatively, a group of target system 110 may share a blockchain address and be assigned separate system IDs that distinguish between systems that use the same blockchain address.

The smart contract 505 verifies 526 the content of the transaction. For example, in one embodiment, if the identifier of the user 501 corresponds to a user that is authorized to submit recipes 131 and the identifier of the approver 503 corresponds to an entity authorized to approve the recipe, the smart contract 505 may verify 526 the transaction. Assuming the transaction is verified 526, the smart contract 505 submits 528 a confirmed verification identifier (e.g., containing a hash of some or all of the data included in the transaction) to the blockchain 140. In response, the smart contract 505 receives 530 confirmation that the request to anchor the transaction data to the blockchain 150 has been submitted 528.

In one embodiment, the blockchain 140 asynchronously anchors 534 the confirmation identifier. Thus, at some point after the verification identifier was submitted 528 to the blockchain 140, anchoring 134 will successfully complete, and the blockchain 140 returns the result 536 to the smart contract 505. Alternatively, a callback based on the smart contract/blockchain implementation may be used. However, to improve speed and performance, rather than wait for confirmation by the result 536, the smart contract 505 may proceed on receiving 530 the event confirmation by returning 532 a transaction receipt and the event confirmation to the distributed ledger module 138.

For convenience, the combination of the transaction receipt and the event confirmation is referred to herein as "A." The distributed ledger module 138 stores 538 A with associated data (e.g., an identifier of the target system 110 and a timestamp). The distributed ledger module 138 returns 540 a success confirmation to the configuration management module 132. Note that at this point, anchoring 534 to the blockchain 140 may or may not be complete. However, based on the success confirmation returned 540 to the configuration management module 132, the actual deployment, tests, and verifications may proceed (either immediately or at a scheduled future time).

The configuration management module 132 sends 542 instructions to the deployment engine 134 to trigger the deployment and affect the recipe 131. The required information, such as the recipe 131 and identity of the target system 110, may be included in the instructions or the deployment engine 134 may obtain some or all of these details from the configuration management database 133. The deployment engine 134 deploys 544 the configurations, software, and the like, defined in the recipe to the target system 110 (either as a build for a new system or a change for an existing system). The target system 110 verifies 546 that installation was successful (installation qualification) or that a change was successfully implemented and returns 548 the results to the deployment engine 134. The deployment engine 134 forwards 550 the results to the configuration management module 132, which may store 552 the results in the configuration management database 133.

The configuration management module 132 may also trigger 553 the qualification testing module 137 to run specific system tests for the target system 110. The qualification testing module 137 may find the specific system tests in the recipe 131 or they may be defined and stored separately. In one embodiment, the qualification testing module 137 runs 554 associated operational qualification tests on the target system 110, obtains 556 the results, and returns 558 those results to the configuration management module 132. The results are stored 560 (e.g., in the configuration management database 133). In another embodiment, a single module is used to deploy the recipe 131, verify installation, and run the operational qualification tests.

At this point, the target system 110 is deployed, verified (installation qualification), and operationally qualified. In one embodiment, the configuration management module 132 sends 562 the deployment results, qualification results, and, if separate from the recipe, the qualification tests (not depicted) to the distributed ledger module 138. The distributed ledger module 138 hashes 564 the received data and submits 566 the hash to be added to the blockchain 140. In other words, the results of deployment, installation qualification, and operational qualification may be reduced down to a single hash. Alternatively, multiple hashes may be generated (e.g., one for each of the deployment, installation qualification, and operational qualification results).

The distributed ledger module 138 receives 568 a response with an event confirmation indicating that the hash is queued to be added to the blockchain 140 asynchronously. The distributed ledger module 138 stores 569 the event confirmation along with associated data, such as an identifier of the target system 110 and a timestamp. The stored 569 combination of the event combination and associated data is referred to herein as "B." At some point, the hash (or hashes) submitted 566 are asynchronously added 570 to the blockchain 140. Thus, the distributed ledger module 138 has A and B stored, describing the approved recipe 131 and the results of deployment of that recipe to the target system 110, respectively, and both A and B can be verified against the blockchain 140.

Example Methods for Proving the Configuration of a Target System

Figure 6:
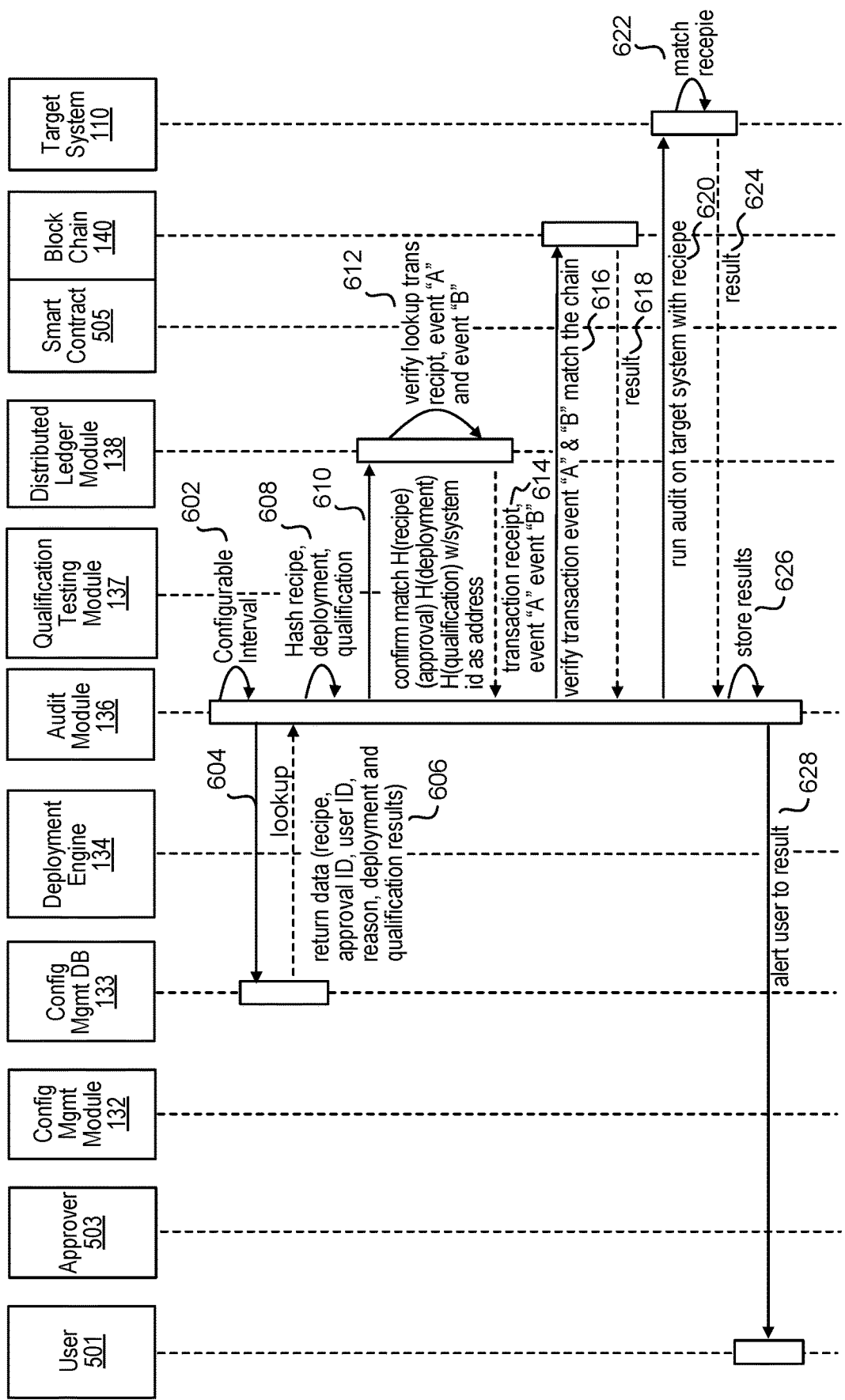
FIG. 6 is an event trace for auditing the current configuration of a system, according to one embodiment.

FIG. 6 illustrates one embodiment of a method for auditing the current configuration of a system. In the embodiment shown in FIG. 6, the method begins with the audit module 136 triggering 602 an audit based on a configurable interval (e.g., daily, weekly, monthly, or the like). When the trigger occurs for a target system 110, the audit module 136 requests 604 that system's most recent data set from the configuration management database 133 (e.g., by querying the database using an identifier of the system and selecting the result with the most recent timestamp). The configuration management database 133 returns 606 the requested dataset. In one embodiment, the dataset includes the recipe 131, the reason/purpose for the recipe (where provided), an identifier of the user 501 that submitted the recipe (e.g., a user ID), an identifier of the approver 503 (e.g., an approver ID), the corresponding deployment results, the corresponding qualification results, and, if separate from the recipe, the qualification tests used.

In the embodiment shown in FIG. 6, the audit module 136 generates 608 two hashes. Note that although these hashes are referred to as first and second, they may be generated 608 in either order, or simultaneously. The audit module 136 may generate 608 the first hash by concatenating the identifier of the target system 110, the recipe 131, the reason/purpose (where provided), the identifier of the approver 503, and the identifier of the user 501 into a single string and then applying a hashing function to that string. The information used in generating 608 the first hash may be referred to as deployment information because it relates to the deployment of the recipe 131 to the target system 110. Similarly, the audit module 136 may generate 608 the second hash by concatenating and hashing the deployment results, the qualification results, and the qualification test or tests used (if they were not in the recipe). The information used to generate 608 the second hash may be referred to as verification information because it relates to verifying that the recipe 131 was successfully deployed and the target system 110 is operating as intended. One of skill in the art will recognize various ways of combining and hashing the various data objects to generate 608 the first and second hashes.

The audit module 136 sends 610 the first and second hashes along with an identifier of the target system 110 (e.g., the target system's blockchain address) to the distributed ledger module 138. The distributed ledger module 138 uses the first and second hashes to look up A (the transaction receipt and event confirmation for anchoring of the recipe) and B (the event confirmation for anchoring of the deployment) that was previously stored locally during deployment of the recipe 131. The distributed ledger module 138 returns 614 A and B to the audit module 136.

The audit module 136 verifies 616 that the data corresponding to A and B have been anchored to the blockchain 140. In one embodiment, the audit module 136 performs a lookup directly on the blockchain 140, which returns 618 a result indicating whether the data corresponding to A and B were previously anchored. Alternatively, the distributed ledger module 138 may verify 616 that the data corresponding to A and B match what was previously anchored on the blockchain 140 and return 618 the results to the audit module 136.

Assuming that A and B are successfully verified 616, the audit module 316 runs 620 an audit on the target system 110 using the recipe 131 that was returned 606 from the configuration management database 133. In one embodiment, the audit module 136 runs 620 the audit by sending audit instructions to the target system 110. The target system 110 executes the instructions, which cause it to match 622 its current configuration to the recipe 131 and return 624 the results of the matching to the audit module 136. The audit module 136 stores 626 the results (e.g., using the data structure shown in FIG. 3) and may notify 628 the user 501 of the results. If the results of each periodic audit are stored 628 (rather than only storing the latest audit result), the audit module 136 may track the configuration of the target system 110 and how it has evolved over time.

Figure 7:
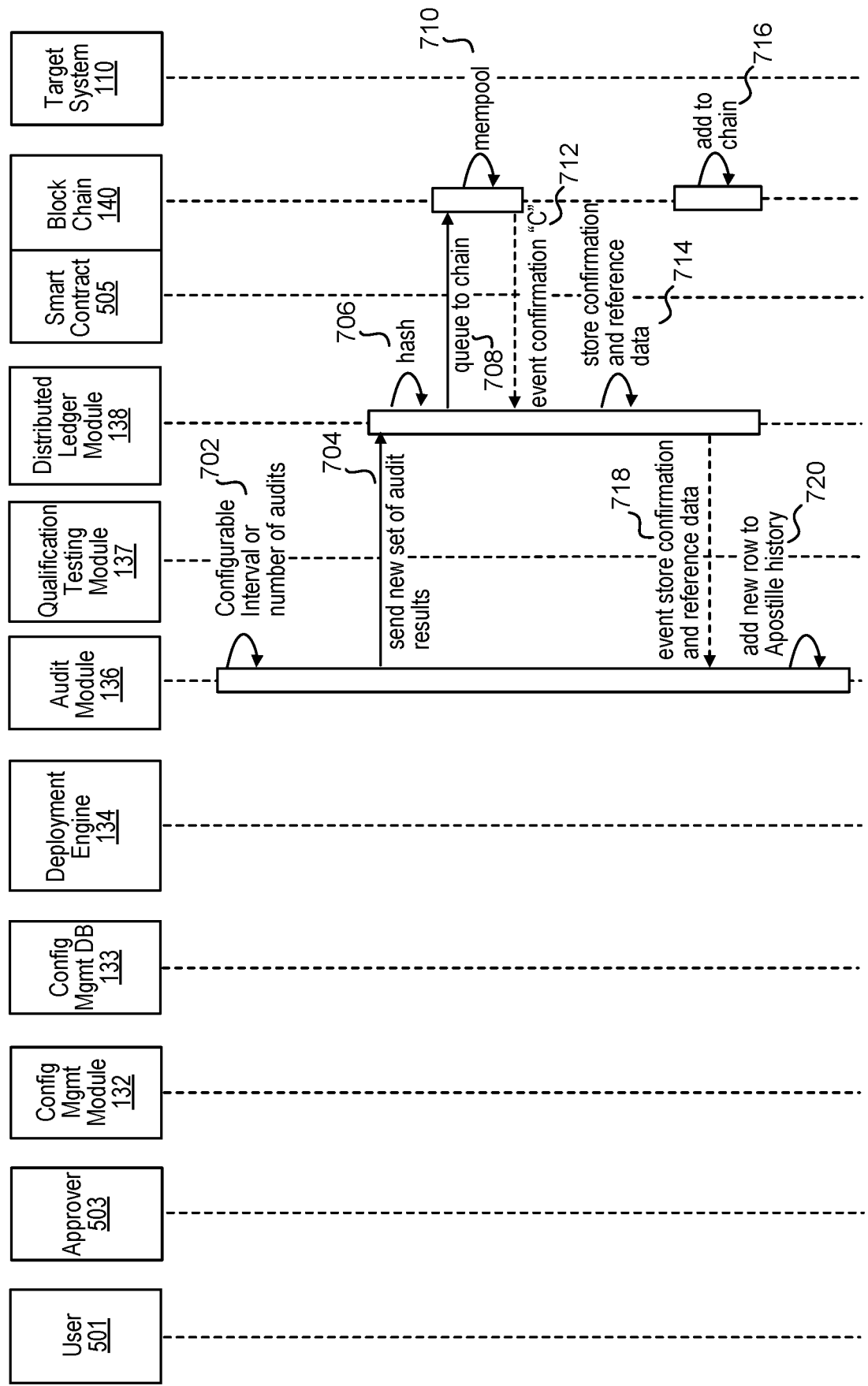
FIG. 7 is an event trace for anchoring the results of an audit for later confirmation, according to one embodiment.

FIG. 7 shows one embodiment of a method for anchoring the results of an audit for later confirmation. As noted previously, in some implementations, it may be impractical due to cost and/or efficiency considerations to anchor the results of every audit to the blockchain 140. Therefore, in the embodiment shown in FIG. 7, the anchoring process is triggered 702 at a configurable interval that may be based on time or the number of audits since the last anchoring operation.

When the process is triggered 702, the audit module 136 identifies a set of audit results that were generated since the last anchoring operation. In one embodiment, the audit module 136 identifies the set of audit results by stepping back through the audit results 310 chronologically and comparing the timestamp 314 of each audit result 310 to the timestamp 354 of the most recent row in the Apostille history 350. The audit results 310 are added to the set until one is found with a timestamp 314 earlier than the timestamp 354 from the Apostille history. Thus, the set may contain all of the audit results 310 generated between the current time and the time of the previous anchoring operation.

The audit module 136 sends 704 the set of audit results 310 to the distributed ledger module 138. In one embodiment, distributed ledger module 138 concatenates and hashes 706 the set of results 310 to create a new group hash 352. Alternatively, the audit module 136 may hash the set of audit results 310 and send the resulting group hash 354 to the distributed ledger module 138. In this case, the group hash 354 may be added to a new row in the Apostille history 350 along with a timestamp 354 and a reference pointer 358 (or pointers) identifying the set of audit results 310 from which the new group hash was generated.

Regardless of which module generated it, the distributed ledger module 138 queues 708 the group hash 352 to the blockchain 140, which adds 710 it to the blockchain mempool to be anchored. The blockchain 140 returns 712 an event confirmation to the distributed ledger module 138 indicating that the group hash 352 is queued for anchoring. The actual block may be added 716 to the blockchain 140 at a later time asynchronously.

The distributed ledger module 138 stores 714 the event confirmation and associated reference data, which are collectively referred to herein as "C." The distributed ledger module 138 also returns 718 C along with the group hash 352 to the audit module 136. In embodiments where a new row has not already been added to the Apostille history 350 at this point (e.g., where the hashing is done by the distributed ledger module 138), the audit module adds 720 a new row including the group hash 352, a timestamp 354, the block chain event reference data 356 (C), and a reference pointer 358 (or pointers) identifying the set of audit results 310 from which the new group hash was generated. Alternatively, if a new row was previously created in the Apostille history 350 (e.g., if the audit module 136 created the group hash 352), C may be added 720 to the existing new row.

Figure 8:
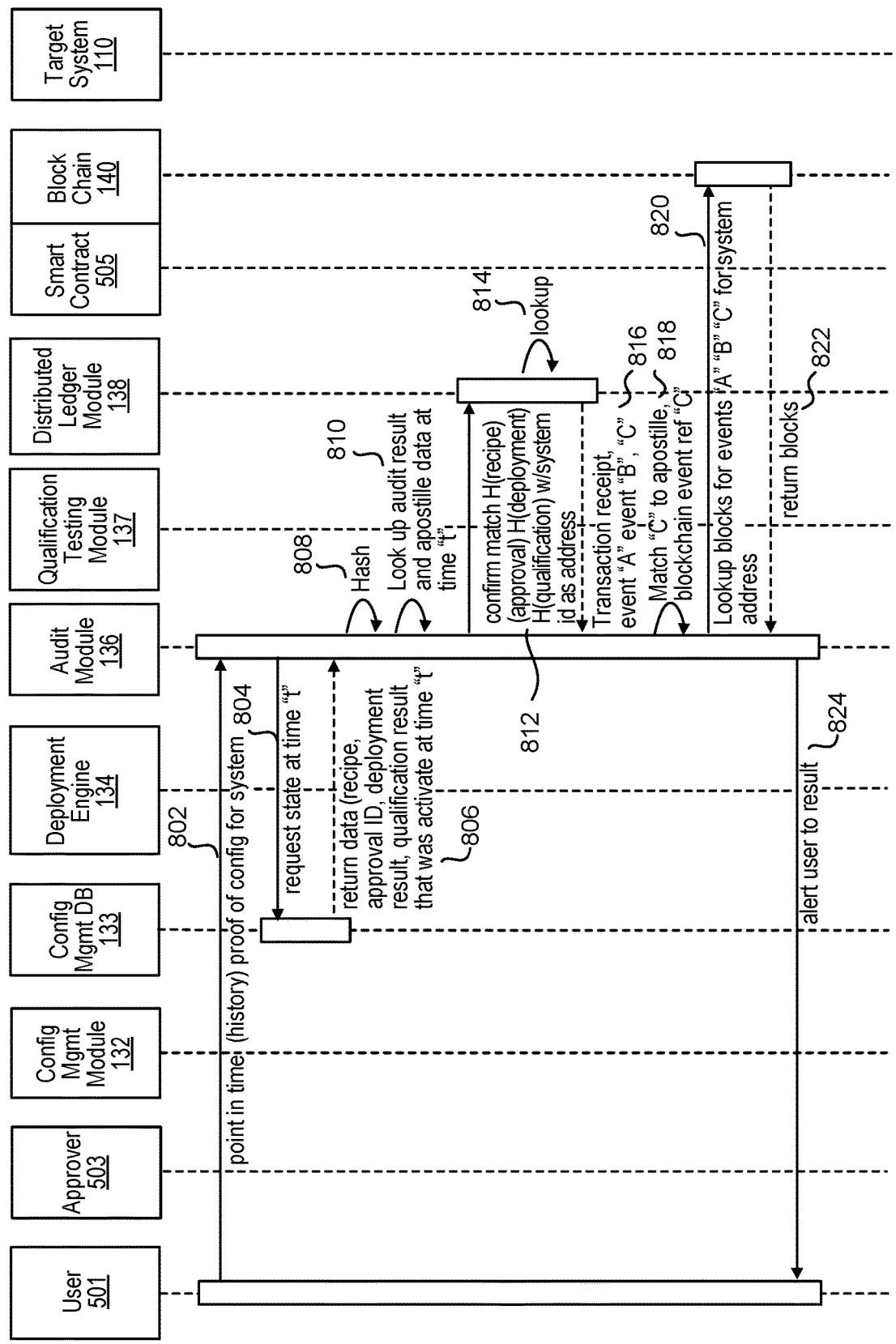
FIG. 8 is an event trace for auditing the configuration of a system at a specified time in the past, according to one embodiment.

FIG. 8 shows one embodiment of a method for auditing the configuration of a system at a specified time in the past. A point-in-time audit such as this may be used to prove that a target system 110 was configured, tested, etc. consistently with approved recipes 131 throughout its use. Regulators often require such proof, and existing techniques often rely on paperwork and trusting the reliability of a human that generates and/or signs the paperwork. In contrast, the example method shown in FIG. 8 does not require trust in a human as the proof is provided by verifying the target system's configuration history against the blockchain 140.

In the embodiment shown in FIG. 8, the method begins with a user 501 specifying the target system 110 and a historical date/time for the audit. An identifier of the target system 110 (e.g., a blockchain address or system ID) and the date/time for the audit are sent 802 to the audit module 136. The audit module 136 requests 804 the stored configuration data set for the target system 110 that is closest to but not more recent than the date/timestamp specified from the configuration management database 133. In response, the configuration management database 133 returns 806 the requested data set, which may include the corresponding recipe 131, the reason/purpose (if one was provided), an identifier of the user that submitted the recipe, an identifier of approver 503 that approved the recipe, the deployment results, the qualification results, and, if separate from the recipe, the qualification tests used. Assuming that the data in the configuration management database 133 has not been altered, the returned data set represents the configuration that was active at the specified point in time.

In one embodiment, to verify the configuration indicated by the returned data set, the audit module 136 generates 808 two hashes. Note that although these hashes are referred to as first and second, they may be generated 808 in either order, or simultaneously. The audit module 136 may generate 808 the first hash by concatenating the identifier of the target system 110, the recipe 131, the reason/purpose (where provided), the identifier of the approver 503, and the identifier of the user 501. Similarly, the audit module 136 may generate 808 the second hash by concatenating and hashing the deployment results, the qualification results, and the qualification test or tests used (if they were not in the recipe).

The audit module 136 looks up 810 the Apostille history data 350 closest to but not more recent than the date/time specified to retrieve the corresponding dataset/row. In one embodiment, the audit module 136 uses the retrieved reference pointer 358 from the Apostille history data 350 to retrieve the set of audit results 310 used to generate the group hash 352 in the Apostille history. The audit module 136 may then regenerate the group hash 352 and verify it matches the retrieved group hash (not depicted). Thus, at this point, the audit module 136 has three hashes: the first hash based on the recipe 131, the second hash based on the test results, and the group hash 352 from the Apostille history 350.

The audit module sends 812 the three hashes along with an identifier of the target system 110 (e.g., the system's blockchain address) and the retrieved Apostille timestamp 354 to the distributed ledger module 138. Based on the received hashes, the identifier of the target system 110, and the Apostille timestamp 354, the distributed ledger module 138 looks up 814 the corresponding instances of A (the transaction receipt and event confirmation for anchoring of the recipe), B (the event confirmation for anchoring of the deployment), and C (the event confirmation for anchoring of regularly scheduled audit results corresponding to the Apostille timestamp 354). The distributed ledger module 138 returns 816 the identified instances of A, B, and C to the audit module 136. In one embodiment, for increased integrity, the audit module 136 may confirm 818 that the returned C from the distributed ledger module 138 matches the blockchain event reference data 356 in the corresponding Apostille history dataset.

In the embodiment shown in FIG. 8, the audit module 136 next verifies 820 A, B, and C have been anchored to the blockchain by performing a lookup directly on the blockchain 140. The blockchain 140 returns 822 the blocks corresponding to A, B, and C, which should match the versions of A, B, and C received from distributed ledger module 138 if the target system 110 was configured consistently with the approved recipe 131 at the specified time. Alternatively, the distributed ledger module 138 may look up the blocks corresponding to A, B, and C on the blockchain 140 and return them to the audit module 136.

Based on the retrieved instances of A, B, and C and the corresponding blocks returned from the blockchain 140, the audit module 136 determines whether the target system 110 was configured consistently with the approved recipe 131 at the specified time and alerts 824 the user 501 to the results of the audit. In one embodiment, the audit module 136 verifies that the target system 110 was configured consistently with the approved recipe 131 if the hashes generated from the data in the configuration management database 133, the instance of A, B, and C retrieved from distributed ledger module 138, and the blocks retrieved from the blockchain 140 match. Consequently, the audit module 136 may alert 824 the user 501 that the system was correctly configured, consistent with an approved recipe 131, at the specified time. In contrast, if the hashes, the instances of A, B, and C, and/or the retrieved blocks do not match, the audit module 136 might alert 824 the user 501 that the target system 110 may not have been configured consistently with the approved recipe 131 at the specified time.

Additional Considerations

The disclosed approaches to proving system configuration as disclosed provides benefits and advantages that include being able to prove the configuration of the target system 110 without relying on the trustworthiness of human actors. The configuration history anchored to the distributed ledger 140 may be outside of the control of the owner of the target system 110 and is exceedingly difficult to modify. Thus, if historical configuration information provided by the owner of the target system 110 matches what is anchored to the ledger, third parties can have confidence that the system was indeed configured as claimed at the time in question, regardless of the trustworthiness of the owner. For example, a regulator may have confidence that computer systems in a laboratory were configured in an approved manner throughout the period for which configuration information is anchored to the distributed ledger. Furthermore, anchoring audit data at a configurable interval allows users to balance cost (both financial and in terms of computing resources) with the need for precision/confidence in the proof of configuration provided. One of skill in the art may recognize other advantages and benefits of the disclosed approaches.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms, for example, as illustrated in FIGS. 1 through 3. Modules may constitute either software modules (e.g., code embodied on a machine-readable medium) or hardware modules. A hardware module is tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

The various operations of example methods described herein may be performed, at least partially, by one or more processors, e.g., processor 402, that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., application program interfaces (APIs).)

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of this specification are presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition X or Y is satisfied by any one of the following: X is true (or present) and Y is false (or not present), X is false (or not present) and Y is true (or present), and both X and Y are true (or present).

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

Upon reading this disclosure, those of skill in the art will appreciate still additional alternative structural and functional designs for a system and a process for proving that a target system 110 was configured as intended, according to an approved recipe 131, through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:

1. A method for proving a computer system was configured consistently with an authorized configuration at a specified time, the method comprising:
   periodically auditing the computer system, each instance of auditing including:
      retrieving most recent configuration information for the computer system from a configuration management data store, the most recent configuration information purporting to describe a configuration of the computer system as a result of deployment of a configuration recipe to the computer system at a point of time in the past, the most recent configuration information including deployment information and verification information, wherein the deployment information includes the configuration recipe and the verification information relates to testing the configuration of the computer system;
      generating a set of reduced representations from the most recent configuration information, the set of reduced representation including a first reduced representation and a second reduced representation, the first reduced representation generated from the deployment information, and the second reduced representation generated from the verification information;
      identifying a set of event confirmations, each event confirmation having been generated to confirm submission of one of a set of previously generated reduced representations to be anchored to a distributed ledger, the previously generated reduced representations having been previously generated from configuration information for the computer during deployment of the configuration recipe;
      confirming that the most recent configuration information is consistent with the authorized configuration by verifying, for each event confirmation, that the corresponding one of the previously generated reduced representations was successfully anchored to the distributed ledger;
      comparing the current configuration of the computer system to the most recent configuration information, wherein a match between the current configuration and the most recent configuration information confirms that the computer system is currently configured consistently with the authorized configuration; and
      storing audit results in an audit data store, each audit result including a timestamp and an outcome, the timestamp indicating a time at which the auditing occurred and the outcome indicting the computer system was configured consistently with the authorized configuration at the time indicated by the timestamp;

periodically committing audit confirmations to the distributed ledger, each periodic commitment including:
identifying a set of one or more audit results for a preceding time period;
generating a group reduced representation of the one or more audit results; and
committing the group reduced representation to the distributed ledger as confirmation of the corresponding audit results; and performing a historical audit for the specified time, the historical audit including:
receiving a request for the historical audit, the request including an identifier of the computer system and the specified time for the historical audit;
retrieving, from the configuration management data store, configuration information for the computer system at the specified time;
generating a second set of reduced representations based on the configuration data;
identifying, in the audit data store, one or more audit results for the computer system corresponding to the specified time;
generating a second group reduced representation based on the one or more audit results for the computer system corresponding to the specified time; and
verifying the configuration of the computer system at the specified time if the second set of reduced representations and the second group reduced representation match corresponding reduced representations that were anchored to the distributed ledger at or before the specified time.

2. The method of claim 1, wherein:
the deployment information further includes an identifier of an entity that approved the configuration recipe and an identifier of a user that created the configuration recipe; and
generating the first reduced representation comprises concatenating the configuration recipe, the identifier of the entity that approved the configuration recipe, and the identifier of the user that created the configuration recipe into a single string, and generating the first reduced representation from the single string.

3. The method of claim 1, wherein:
the verification information includes deployment results and qualification results; and
generating the second reduced representation comprises concatenating the deployment results and the qualification results into a single string, and determining the second reduced representation based on the single string.

4. The method of claim 1, further comprising:
receiving the configuration recipe and approval for the configuration recipe;
verifying the configuration recipe using a smart contract based on the approval;
generating, responsive to the configuration recipe being verified, a reduced representation based on the configuration recipe; and
anchoring the reduced representation based on the configuration recipe to the distributed ledger, wherein the reduced representation based on the configuration recipe is one of the previously generated reduced representations.

5. The method of claim 1, further comprising:
deploying the configuration recipe to the computer system;
receiving deployment results indicating that deployment of the configuration recipe was successful;
initiating a qualification test for the computer system;
receiving qualification results indicating that the computer system is operating as intended;
generating a reduced representation based on the deployment results and the qualification results; and
anchoring a representation of the qualification test in conjunction with the reduced representation based on the deployment results and the qualification results to the distributed ledger, wherein the reduced representation based on the deployment results and the qualification results is one of the previously generated reduced representations.

6. The method of claim 1, wherein identifying the set of one or more audit results for the preceding time period comprises:
retrieving audit results from the audit data store that have timestamps more recent than an immediately previous periodic commitment of audit results to the distributed ledger;
aggregating the retrieved audit results to form the set of one or more audit results;
generating the group reduced representation from the aggregated retrieved audit results;
anchoring the group reduced representation to the distributed ledger; and
storing the group reduced representation in conjunction with a current timestamp and a pointer to a location of the results in the audit data store.

7. The method of claim 1, wherein periodically auditing the computer system comprises auditing the computer system daily, weekly, or monthly.

8. The method of claim 1, wherein the distributed ledger is a blockchain, the set of reduced representations is a first set of hashes, and the previously generated reduced representations is a second set of hashes.

9. A proof of configuration system for proving a computer system was configured consistently with an authorized configuration at a specified time, the proof of configuration system comprising:
a processor; and
a computer-readable media comprising stored instructions that, when executed, cause the processor to:
periodically audit the computer system, wherein the instructions for each periodic audit include instructions that cause the processor to:
retrieve, from a configuration management data store, most recent configuration information for a computer system for which proof of configuration is desired, the configuration information purporting to describe a configuration of the computer system as a result of deployment of a configuration recipe to the computer system at a point of time in the past, the most recent configuration information including deployment information and verification information, wherein the deployment information includes the configuration recipe and the verification information relates to testing the configuration of the computer system;

generate a set of reduced representations from the most recent configuration information, the set of reduced representation including a first reduced representation and a second reduced representation, the first reduced representation generated from the deployment information, and the second reduced representation generated from the verification information;

identify a set of event confirmations, each event confirmation having been generated to confirm submission of one of a set of previously generated reduced representations to be anchored to a distributed ledger, the previously generated reduced representations having been previously generated from configuration information for the computer during deployment of the configuration recipe;

confirm that the most recent configuration information is consistent with the authorized configuration, the instructions that cause the processor to confirm that the most recent configuration information is consistent with the authorized configuration including instructions that cause the processor to verify, for each event confirmation, that the corresponding one of the previously generated reduced representations was successfully anchored to the distributed ledger;

compare the current configuration of the computer system to the most recent configuration information, wherein a match between the current configuration and the most recent configuration information confirms that the computer system is currently configured consistently with the authorized configuration; and store audit results in an audit data store, each audit result including a timestamp and an outcome, the timestamp indicating a time at which the audit occurred and the outcome indicting the computer system was configured consistently with the authorized configuration at the time indicated by the timestamp;

periodically commit audit confirmations to the distributed ledger, wherein the instructions for each periodic commit include instructions that cause the processor to:

identify a set of one or more audit results for a preceding time period;

generate a group reduced representation of the one or more audit results; and commit the group reduced representation to the distributed ledger as confirmation of the corresponding audit results; and perform a historical audit for the specified time, wherein the instructions for the historical audit include instructions that cause the processor to:

receive a request for the historical audit, the request including an identifier of the computer system and the specified time for the historical audit;

retrieve, from the configuration management data store, configuration information for the computer system at the specified time;

generate a second set of reduced representations based on the configuration data;

identify, in the audit data store, one or more audit results for the computer system corresponding to the specified time;

generate a second group reduced representation based on the one or more audit results for the computer system corresponding to the specified time; and verify the configuration of the computer system at the specified time if the second set of reduced representations and the second group reduced representation match corresponding reduced representations that were anchored to the distributed ledger at or before the specified time.

10. The system of claim 9, wherein:

the deployment information further includes an identifier of an entity that approved the configuration recipe and an identifier of a user that created the configuration recipe; and the instructions to generate the first reduced representation comprise instructions to concatenate the configuration recipe, the identifier of the entity that approved the configuration recipe, and the identifier of the user that created the configuration recipe into a single string, and instructions to generate the first reduced representation from the single string.

11. The system of claim 9, wherein the instructions further comprise instructions that, when executed, cause the processor to:

receive the configuration recipe and approval for the configuration recipe;

verify the configuration recipe using a smart contract based on the approval;

generate, responsive to the configuration recipe being verified, a reduced representation based on the configuration recipe; and anchor the reduced representation based on the configuration recipe to the distributed ledger, wherein the reduced representation based on the configuration recipe is one of the previously generated reduced representations.

12. The system of claim 9, wherein the instructions further comprise instructions that, when executed, cause the processor to:

deploy the configuration recipe to the computer system;

receive deployment results indicating that deployment of the configuration recipe was successful;

initiate a qualification test for the computer system;

receive qualification results indicating that the computer system is operating as intended;

generate a reduced representation based on the deployment results and the qualification results; and anchor a representation of the qualification test in conjunction with the reduced representation based on the deployment results and the qualification results to the distributed ledger, wherein the reduced representation based on the deployment results and the qualification results is one of the previously generated reduced representations.

13. The system of claim 9, wherein the instructions that cause the processor to identify the set of one or more audit results for the preceding time period comprise instructions that, when executed, cause the processor to:

retrieve audit results from the audit data store that have timestamps more recent than an immediately previous periodic commitment of audit results to the distributed ledger;

aggregate the retrieved audit results to form the set of one or more audit results;

generate the group reduced representation from the aggregated retrieved audit results;

anchor the group reduced representation to the distributed ledger; and store the group reduced representation in conjunction with a current timestamp and a pointer to a location of the results in the audit data store.

14. The system of claim 9, wherein:

the verification information includes deployment results and qualification results; and the instructions to generate the second reduced representation comprise instructions to concatenate the deployment results and the qualification results into a single string, and instructions to determine the second reduced representation based on the single string.

15. A non-transitory computer readable medium configured to store instructions, the instructions when executed by a processor causing the processor to:

periodically audit a computer system, wherein the instructions for each periodic audit include instructions that cause the processor to:

retrieve, from a configuration management data store, most recent configuration information for a computer system for which proof of configuration is desired, the configuration information purporting to describe a configuration of the computer system as a result of deployment of a configuration recipe to the computer system at a point of time in the past, the most recent configuration information including deployment information and verification information, wherein the deployment information includes the configuration recipe and the verification information relates to testing the configuration of the computer system;

generate a set of reduced representations from the most recent configuration information, the set of reduced representation including a first reduced representation and a second reduced representation, the first reduced representation generated from the deployment information, and the second reduced representation generated from the verification information;

identify a set of event confirmations, each event confirmation having been generated to confirm submission of one of a set of previously generated reduced representations to be anchored to a distributed ledger, the previously generated reduced representations having been previously generated from configuration information for the computer during deployment of the configuration recipe;

confirm that the most recent configuration information is consistent with the authorized configuration, the instructions that cause the processor to confirm that the most recent configuration information is consistent with the authorized configuration including instructions that cause the processor to verify, for each event confirmation, that the corresponding one of the previously generated reduced representations was successfully anchored to the distributed ledger;

compare the current configuration of the computer system to the most recent configuration information, wherein a match between the current configuration and the most recent configuration information confirms that the computer system is currently configured consistently with the authorized configuration; and store audit results in an audit data store, each audit result including a timestamp and an outcome, the timestamp indicating a time at which the audit occurred and the outcome indicting the computer system was configured consistently with the authorized configuration at the time indicated by the timestamp;

periodically commit audit confirmations to the distributed ledger, wherein the instructions for each periodic commit include instructions that cause the processor to:

identify a set of one or more audit results for a preceding time period;

generate a group reduced representation of the one or more audit results; and commit the group reduced representation to the distributed ledger as confirmation of the corresponding audit results; and perform a historical audit for a specified time, wherein the instructions for the historical audit include instructions that cause the processor to:

receive a request for the historical audit, the request including an identifier of the computer system and the specified time for the historical audit;

retrieve, from the configuration management data store, configuration information for the computer system at the specified time;

generate a second set of reduced representations based on the configuration data;

identify, in the audit data store, one or more audit results for the computer system corresponding to the specified time;

generate a second group reduced representation based on the one or more audit results for the computer system corresponding to the specified time; and verify the configuration of the computer system at the specified time if the second set of reduced representations and the second group reduced representation match corresponding reduced representations that were anchored to the distributed ledger at or before the specified time.

16. The non-transitory computer readable medium of claim 15, wherein:

the deployment information further includes an identifier of an entity that approved the configuration recipe and an identifier of a user that created the configuration recipe; and the instructions to generate the first reduced representation comprise instructions to concatenate the configuration recipe, the identifier of the entity that approved the configuration recipe, and the identifier of the user that created the configuration recipe into a single string, and instructions to generate the first reduced representation from the single string.

17. The non-transitory computer readable medium of claim 15, wherein the instructions further comprise instructions that, when executed, cause the processor to:

receive the configuration recipe and approval for the configuration recipe;

verify the configuration recipe using a smart contract based on the approval;

generate, responsive to the configuration recipe being verified, a reduced representation based on the configuration recipe; and anchor the reduced representation based on the configuration recipe to the distributed ledger, wherein the reduced representation based on the configuration recipe is one of the previously generated reduced representations.

18. The non-transitory computer readable medium of claim 15, wherein the instructions further comprise instructions that, when executed, cause the processor to:

deploy the configuration recipe to the computer system;
receive deployment results indicating that deployment of the configuration recipe was successful;
initiate a qualification test for the computer system;
receive qualification results indicating that the computer system is operating as intended;
generate a reduced representation based on the deployment results and the qualification results; and
anchor a representation of the qualification test in conjunction with the reduced representation based on the deployment results and the qualification results to the distributed ledger, wherein the reduced representation based on the deployment results and the qualification results is one of the previously generated reduced representations.

19. The non-transitory computer readable medium of claim 15, wherein the instructions that cause the processor to identify the set of one or more audit results for the preceding time period comprise instructions that, when executed, cause the processor to:
retrieve audit results from the audit data store that have timestamps more recent than an immediately previous periodic commitment of audit results to the distributed ledger;
aggregate the retrieved audit results to form the set of one or more audit results;
generate the group reduced representation from the aggregated retrieved audit results;
anchor the group reduced representation to the distributed ledger; and
store the group reduced representation in conjunction with a current timestamp and a pointer to a location of the results in the audit data store.

20. The non-transitory computer readable medium of claim 15, wherein:
the verification information includes deployment results and qualification results; and
the instructions to generate the second reduced representation comprise instructions to concatenate the deployment results and the qualification results into a single string, and instructions to determine the second reduced representation based on the single string.

21. The non-transitory computer readable medium of claim 15, wherein the instructions that cause the processor to periodically audit the computer system comprise instructions that cause the processor to audit the computer system daily, weekly, or monthly.

* * * * *